United States Patent [19]
Goldstein

[11] Patent Number: 6,118,639
[45] Date of Patent: Sep. 12, 2000

[54] FAST ACTING DISCONNECT SYSTEM FOR PROTECTING SURGE SUPPRESSORS AND CONNECTED UTILIZATION EQUIPMENT FROM POWER LINE OVERVOLTAGES

[76] Inventor: Richard Goldstein, 1671 E. Mission Hills Rd., Northbrook, Ill. 60062-5734

[21] Appl. No.: 09/280,358

[22] Filed: Mar. 29, 1999

Related U.S. Application Data

[63] Continuation-in-part of application No. 09/086,760, May 28, 1998, abandoned
[60] Provisional application No. 60/048,333, May 30, 1997.

[51] Int. Cl.[7] ................................................ H02H 3/20
[52] U.S. Cl. ........................................ 361/55; 361/41.1
[58] Field of Search .............................. 361/54, 55, 91.1, 361/93.1, 111, 119, 91.5, 91.6

[56] References Cited

U.S. PATENT DOCUMENTS

| | | | |
|---|---|---|---|
| 4,587,588 | 5/1986 | Goldstein | 361/54 |
| 4,636,910 | 1/1987 | Chadwick | 361/103 |
| 4,918,562 | 4/1990 | Pulizzi et al. | 361/86 |
| 4,999,728 | 3/1991 | Curl | 361/33 |
| 5,617,288 | 4/1997 | Zaretsky | 361/127 |

*Primary Examiner*—Ronald W. Leja

[57] ABSTRACT

A fast acting disconnect system is incorporated with a transient voltage surge suppressor to protect the surge suppressor and the connected utilization equipment from power frequency overvoltages. A resettable circuit breaker permits reconnection after disconnecting the AC voltage source due to a power frequency overvoltage. The system is applicable to protect equipment connected to an AC source of voltage that has a phase conductor, a neutral conductor and a grounding conductor with surge suppressors connected to protect against transient voltage surges from phase-to-neutral, phase-to-ground and neutral-to-ground. The system protects against damage of the surge suppressor and the connected equipment from power frequency overvoltages as specified for testing by a recognized testing agency. A transient voltage surge of the greatest magnitude anticipated in the environment for which the system is designed will not cause a false disconnect operation. The system will respond to a power frequency overvoltage under conditions in which it is not energized prior to the application of the overvoltage.

20 Claims, 9 Drawing Sheets

FAST ACTING DISCONNECT SYSTEM FOR PROTECTING SURGE SUPPRESSORS AND CONNECTED UTILIZATION EQUIPMENT FROM POWER LINE OVERVOLTAGES

CONTINUATION-IN-PART APPLICATION

The present application is a continuation-in-part of applicant's U.S. patent application Ser. No. 09/086,760 May 28, 1998 entitled "FAST ACTING DISCONNECT SYSTEM FOR PROTECTING SURGE SUPPRESSORS AND CONNECTED UTILIZATION EQUIPMENT FROM POWER LINE OVERVOLTAGES", now abandoned, which claims the benefit of U.S. Provisional Application Ser. No. 60/048,333, filed May 30, 1997 and incorporates the entire contents and subject matter thereof. It further incorporates improvements recently required by a recognized safety testing agency for compliance with transient leakage current limits.

BACKGROUND OF THE INVENTION

This invention relates to an electrical disconnect system for protecting transient voltage surge suppressor components and the surge protected utilization equipment connected thereto from power frequency overvoltages.

Metal-oxide-varistors (MOVs) are the most widely used surge-suppressor components employed in devices for suppressing transient voltage surges in low voltage (120/240 volt) industrial, commercial and household electrical distribution systems. Their low cost and effectiveness have greatly contributed to their widespread use. Metal-oxide-varistors are subject to failure from transient voltage surges that exceed their maximum energy absorption capability or their pulse lifetime ratings. It is believed by many observers, however, that most of the failures of these devices that occur in typical low voltage electrical distribution applications are not related to the MOV's transient voltage surge exposure but are caused by power frequency overvoltages. The manner in which these devices fail from power frequency overvoltages is often violent and dangerous. Such failure modes can result in severe overheating and a subsequent cause of fire and/or electric shock hazard. The safety hazards resulting from MOV failures have become recognized to the extent that the Underwriters Laboratory Standard for Transient Voltage Surge Suppressors (UL 1449) has recently been revised to deal specifically with the question of safe failure modes for metal-oxide-varistors when subjected to power frequency overvoltages.

To assure safe failure modes from various causes of MOV failures the surge suppression devices must be subjected to electrical stresses that induce such failures. Stress tests have been devised that simulate overvoltage conditions caused by the electrical distribution problems outlined below that are known to cause such failures:

1. Power frequency overvoltages with high current available. Such overvoltages can occur from voltage "swells" incident to utility operations such as power grid automatic switching during severe storms to maintain service when part of the system has been damaged. Such power frequency overvoltages can cause overheating of varistors resulting in "thermal runaway" and violent failure modes, which can rupture the MOV body and cause the emission of flames or molten metal.

2. Wire-crosses caused by electrical system damage or accidents. Such accidents or damage to the distribution system can result in the impression of extreme overvoltages such as twice or more the normal line voltage with high available current levels. Such overvoltages usually result in explosive violent failure modes.

3. Limited current power frequency overvoltage. Such a condition can result from a defect or accident in the electrical distribution system. The most common cause is a "dropped" or open neutral conductor in a three-phase "wye" connected system or split-single-phase 120/240-volt system (such as a typical household electrical supply). The overvoltage causes an extreme temperature rise in the MOV even though the current may be too small to activate any upstream overcurrent protection device such as a fuse or circuit breaker. This is one of the most dangerous failure modes because the overheated MOV can ignite nearby flammable materials and result in an "electrically fed" fire.

To test for safe failure modes under the conditions described above, UL has included a series of "Abnormal Overvoltage Tests" in the new UL 1449 Standard:

Temporary overvoltage (TOV)—high current abnormal overvoltage test. This is a seven-hour test at 125% of rated supply voltage from a 1000 ampacity source.

Full phase voltage—high current abnormal overvoltage test. This test applies twice the maximum rated supply voltage (240 volts) with high current (1000 amperes) available.

Limited current abnormal overvoltage test. This test applies twice-rated normal operating voltage but limits the current to a value below the trip point of any over-current protection devices in the supply line. The test results in non-violent intense heating of the MOVs.

FIG. 1 is a schematic diagram of a prior art surge suppressor employing three metal-oxide-varistors MOV1, MOV2 and MOV3. It is designed to provide protection from transient voltage surges that appear across any pair of conductors PHASE to NEUTRAL, PHASE to GROUND, and NEUTRAL to GROUND. To protect against fire and electric shock hazards from the causes described in paragraphs 1. through 3. above, additional supplementary protection devices are employed. A fuse FUSE 20A and thermal cutoff TCO1 are inserted in the ungrounded current-carrying conductor PHASE ahead of the varistor surge suppression components. A second thermal cutoff TCO2 is placed in series with MOVs MOV2 and MOV3. The thermal cutoffs TCO1 and TCO2 are thermally activated non-resettable devices that permanently open the circuit upon reaching a specified temperature. MOV MOV1 is placed in close proximity to the thermal cutoff TCO1. MOVs MOV2 and MOV3 are placed in close proximity to thermal cutoff TCO2. The fuse FUSE 20A will open the circuit for failures of MOVs MOV1 or MOV2 resulting from the conditions described in paragraphs 1. and 2. above, thus providing a safe failure mode for these two MOVs for those causes of failure. The thermal cutoff TCO1 will open to provide a safe failure mode for MOV MOV1 if subjected to the limited current overvoltage described in 3. above. Thermal cutoff TCO2 will also provide a safe failure mode for MOVs MOV2 or MOV3 from a limited current overvoltage.

The prior art described above is effective in providing safe failure modes from the power frequency overvoltages applied from conductors PHASE-to-NEUTRAL and PHASE-to-GROUND, but it leaves some uncertainty with regard to safe failure when overvoltages described in 1. and 2. are applied to the ungrounded conductor NEUTRAL and the grounding conductor GROUND. This and other deficiencies and disadvantages of the prior art are detailed below:

(1) There is no fast acting fuse in the neutral conductor because UL and The National Electrical Code prohibit it. Consequently, safe failure of MOV MOV3 for power frequency overvoltages as described above in 1. and 2. depends upon heating thermal cutoff TCO1 to its operating temperature or rupturing the MOV body and blowing a soldered lead off the body to open the circuit. Heating thermal cutoff TCO1 to its operating temperature from the explosive failure mode of a high current overvoltage is unlikely and at best unreliable. A fast acting fuse in series with MOV MOV3 would avoid the blow-open scenario. However the use of such a fuse is undesirable because the fuse blowing could create a powerful inductive transient voltage surge that would be applied directly to the connected equipment. It would also leave the connected equipment unprotected from further surges and the power frequency overvoltage. (The fast acting fuse FUSE 20A in the conductor PHASE, being in series with the load, blows open to block the power frequency overvoltage as well as any inductive transient surge voltage that might be generated by the fuse blowing).

(2) After the fuse FUSE 20A or the thermal cutoff TCO1 opens, the surge suppressor device would be rendered inoperative and would have to be discarded.

(3) Heating of MOVs MOV2 or MOV3 from a limited current overvoltage would open thermal cutoff TCO2 and leave the connected equipment energized but unprotected from further surges and power frequency overvoltages occurring between conductors PHASE-to-GROUND and NEUTRAL-to-GROUND.

Other prior art is disclosed in Pat. No. 5,617,288 to Zaretsky, Apr. 1, 1997. It is intended to protect the MOV 14 from the Limited Current Overvoltage described in 3. above. This invention employs a circuit that scales and integrates the voltage applied to a MOV. The integrator output is intended to determine the length of time that the MOV is subjected to an overvoltage. This output is compared to a reference voltage that is intended to coincide with the time and magnitude of an overvoltage condition that is just below the MOV damage level. When the output reaches the reference level a relay is actuated that disconnects the MOV from the applied voltage.

This patent does not show any relationship of the voltage applied to the MOV and the voltage applied to the load. Thus it does not contemplate or teach protecting the equipment connected to the surge suppressor from the overvoltage.

This patent does not teach what would be required to protect from overvoltages in typical commercial devices that protect all three nodes—namely, phase-to-neutral, phase-to-ground and neutral-to-ground.

Overvoltages can occur during electrical distribution accidents any time after a complete power failure and before normal voltage is restored. A protection system should operate in such an event. There is no disclosure of how the system would operate if the device were not previously energized prior to the occurrence of an overvoltage. This is important because Zaretsky's patent uses active components that require a power source. Another disadvantage is that protection from high current overvoltages as described in 1. and 2. above is provided by a fuse in series with the MOV. This has the same disadvantages as described for the prior art surge suppressor in (2) above.

Other prior art is disclosed in Pat. No. 4,918,562 to Pulizzi, Apr. 17, 1990. A similarity exists in the teaching of this patent in the use of a capacitor 10 to store energy that is utilized to actuate a circuit breaker 112. The primary purpose of the Pulizzi system is to provide a means of disconnecting the source of AC power in the event of a complete power failure. The capacitor 10 is discharged through the circuit breaker actuator coil 142 upon the de-energization of relay K1. This assures system shut-down if a complete power failure occurs, and forces a manual orderly start-up when normal power is restored, for which the system is designed. The shutdown will also be activated if the power line voltage magnitude moves outside of a predetermined window defined as low and high voltage fault limits. This patent concerns damage to connected equipment or process failure involving connected equipment during power line voltage fluctuations such as "sags" and "swells". There is no mention of surge suppressor components, or speed of response required to protect such components or the connected equipment in the event of severe power line overvoltages as described in 1. and 2. above. No mention is made of the time required to sense the voltage and operate relay K1, which time delay will affect the speed with which the circuit breaker 112 will open the circuit. Because relay operation is slowest upon release, this system would not operate fast enough to protect metal-oxide-varistor surge suppressor components from a severe high current overvoltage.

SUMMARY OF THE INVENTION

In the specification and claims of this invention there are a number of references to solid state devices as a "controlled switch", a "threshold voltage conducting device" and a "threshold voltage triggered switch". Each category includes various types, many of which may be applied satisfactorily in this invention, although certain ones are preferable in different embodiments. In the interest of clarity these components are described below more fully with regard to their electrical characteristics and the common names to which they are often referred are provided: Controlled switch: A mechanical or solid state switch. Such switches have load terminals and control terminals. An example of a mechanical controlled switch is a reed switch with an actuating coil; it has control terminals isolated from its load terminals. Most solid state controlled switches have one control terminal common with one of the load terminals. Solid state controlled switches are transistors (either bipolar or field effect) or thyristors. Some solid state switches are combined with electro-optical devices to provide separate isolated control terminals. Common names: Bipolar transistor, IGBT (insulated gate bipolar transistor), FET (field effect transistor) SCR (silicon controlled rectifier), TRIAC, GTO (gate turn off switch) and OPTO-COUPLER. When combined to produce four terminal bipolar or unipolar switches with isolated control terminals such devices are often referred to as SOLID STATE RELAYS. Threshold voltage conducting device: A two terminal device that remains in a high impedance (low-conducting) state until the threshold voltage is applied. Above the threshold voltage it conducts high current with little further voltage increase thus exhibiting low dynamic impedance in this region. These devices all depend upon the semiconductor diode reverse breakdown effect. Common Names: Zener diode, SAD (silicon avalanche diode), TVS (transient voltage suppressor), TRANSORB and MOV (metal-oxide-varistor). Zener diodes are unipolar; MOVs are bipolar. TVSs, SADs and TRANSORBS are either unipolar or bipolar. Threshold voltage triggered switch: A device (or combination of devices) that breaks down from high impedance to low impedance when the threshold voltage is applied. There are a number of two-terminal bipolar devices currently available that perform this function. They are generically referred to as "silicon bilateral voltage triggered switches". Common Names: SIDAC, SIDACTOR, DIAC and STS (Silicon trigger switch). This function can also be provided by a combination of a Controlled Switch and a Threshold Voltage Conducting Device as described above.

In accordance with one aspect of the present invention there is provided an electrical disconnect system for protecting transient voltage surge suppressors and the surge protected utilization equipment connected thereto from power frequency overvoltages. It is particularly applicable to surge suppressors in which metal-oxide-varistor surge suppression components are employed. The protection system employs an electrically operated switch for connecting and disconnecting the surge suppressor and utilization equipment to a source of AC operating voltage, and a switch operating mechanism for opening the disconnect switch. A sense and control circuit detects a threatening power frequency overvoltage and energizes the switch operating mechanism that actuates the disconnect switch to disconnect the surge suppressor and the connected utilization equipment from the source of AC voltage to which it is normally connected. The electrically operated switch is preferably designed to be manually reset when normal operating AC voltage is restored so as to reconnect the surge suppressor and utilization equipment to the source of AC voltage. In the event of a power frequency overvoltage as specified for surge suppressor safety testing by recognized safety testing agencies, the switch operating mechanism will effect disconnect of the source of AC power rapidly enough to protect the surge suppressor components from being damaged by the power frequency overvoltage. It will also protect most utilization equipment which has been designed to operate safely within the U.S. federal *GUIDELINE ON ELECTRICAL POWER FOR ADP INSTALLATIONS* (*FIPS PUB* 94) as shown in the graphic therein entitled "*Susceptibility profile to line voltages and disturbances*".

The above mentioned sense and control circuit preferably includes a capacitor and a charging circuit therefor which upon the event of a potentially damaging power frequency overvoltage charges the capacitor to a predetermined energizing voltage level. Upon reaching this voltage level a threshold voltage triggered switch connecting the capacitor to the above mentioned switch operating mechanism, switches to a low impedance condition and discharges the capacitor through the switch operating mechanism to open the disconnect switch, thereby removing the overvoltage from the surge suppressor components and the connected utilization equipment.

In a preferred form of the invention the use of a charged capacitor to energize the electrically operated circuit-disconnect mechanism is an important novel feature of the invention because it provides low cost and reliable protection from destructive limited-current overvoltages where the current magnitude is sufficiently high to destroy the surge suppressor component but too low to energize the switch operating mechanism. Metal-oxide-varistor surge suppressors have high pulse energy absorption ratings for short duration pulses, but low steady-state power ratings, typically, one watt for a 20 mm, 130 Volt RMS device. Power frequency overvoltages resulting in currents as low as 10 milliamperes RMS can cause overheating and destructive thermal damage to these surge suppressor components. Fusing for such low currents is not feasible because the fuse would blow from a transient voltage surge or the normal utilization equipment load current if located in the load circuit. Also, such low currents will not effect operation of the switch operating mechanism such as an electromagnetic actuator of a mechanical circuit breaker. However, by sensing a predetermined capacitor charge voltage level resulting from a power frequency overvoltage involved in these limited current overvoltages, and immediately discharging the capacitor to energize the switch operating mechanism, the surge suppressor is disconnected from the source of AC voltage rapidly enough to protect it from such limited current overvoltages.

The feature of the protection system for charging the capacitor directly from the AC voltage source avoids the need for a separate source of power such as a transformer power supply operating from the source of AC voltage. This also provides the benefit of protection from a power frequency overvoltage that occurs after a complete power failure, but before normal power is restored; a not uncommon event. This is accomplished by rapidly providing all the necessary energy for the sense and control circuit to properly function from the power frequency overvoltage itself. Additionally, it simplifies the design, increases the reliability and lowers the cost of the protection system.

For power frequency overvoltages where extremely high current is available, the disconnect mechanism must operate rapidly enough to prevent the absorbed energy from damaging or destroying the surge suppression device. The damaging energy level is about equal to the specified maximum single pulse energy rating of the metal-oxide-varistor involved. When exposed to such high-current power frequency overvoltages for testing surge suppressor safe failure modes as specified by recognized safety testing agencies, it has been found that the disclosed system will provide safe and effective protection from damage or failure.

One embodiment of the protection system is applicable to a source of AC power having phase and neutral current carrying conductors at a location where the neutral conductor is bonded to an earth grounding conductor, such as at a utility service entry panel. The protection device could, for instance, be incorporated into a panel circuit breaker providing transient voltage surge protection and overvoltage protection as well as the usual overcurrent protection. Such locations require surge suppression components connected to only the phase and neutral conductors since no transient voltage surges can exist between the bonded neutral and grounding conductors. However, it is important that the protection system also be applicable to AC distribution systems employing phase, neutral and grounding conductors at electrical outlet locations distant from the service entry panel where substantial transient voltage surges can exist between the neutral or phase conductors and the grounding conductor. This requires surge suppression components to be connected between all three pairs of conductors. In such a configuration the sense and control circuit must be able to detect a power frequency overvoltage between the neutral or phase conductor and the grounding conductor in order to provide the desired protection. To accomplish this necessitates the connection of components of the sense and control circuit to the grounding conductor. Such connections constitute a conductive path for leakage currents to the grounding conductor that must comply with Underwriters Laboratory and other recognized safety testing agencies' standards that limit such leakage currents to a maximum of 0.5 milliamperes when the phase or neutral conductor is energized by normal line voltage applied between it and the grounding conductor. The above stated embodiment complies with the steady state leakage limits stated above. However that embodiment does not comply with a recently invoked second leakage requirement that involves transient leakage currents that may exist when the protection system is initially connected to the source of AC voltage. In an electrical distribution system employing a grounding conductor, the energy storage capacitor will charge through the grounding conductor upon initial application of the leakage testing voltage. This brief charging current is a regarded as "Transient Leakage Current" and must comply with the time and magnitude limits for transient electric shock hazard currents as defined in the safety standards. This is accomplished in the new preferred embodiment of the invention by employing at least one solid state device in its high impedance (non-conducting) state in each circuit path to the grounding conductor. The blocking voltage of these devices in their non-conducting states is greater than any voltage to which they will be subjected over the normal operating voltage range, thereby preventing both undesired operation of the disconnect switch and dangerous leakage currents under normal operating conditions.

Another important feature of the protection system is that transient voltage surges of the greatest magnitude in the environment for which the surge suppressor was designed will not actuate the disconnect function. Such activation would result in nuisance equipment shutdowns and loss of data in computer systems that are being protected from the transient voltage surges, thereby considerably defeating the benefit of the transient voltage surge suppressor. Prevention of such nuisance shutdown is accomplished by employing a charge-limiting impedance such as a resistor, inductor or combination thereof in the capacitor charging circuit such that a power frequency overvoltage will still charge the capacitor to the switch operating voltage level but a short duration transient voltage surge will charge the capacitor to less than the switch operating level. An alternative way of preventing such nuisance shutdown in the improved preferred embodiment is by employing a low-pass filter in the control circuit of a controlled switch in the capacitor charging circuit. The large time scale difference between the power frequency overvoltage duration and the duration of the transient voltage surge makes such charge limiting or low-pass filtering practical to achieve.

Accordingly, an object of the invention is to provide a simple, reliable and low cost system for protecting metal-oxide-varistor surge suppressor components from being damaged by power frequency overvoltages that supply potentially damaging current in the range of about 10 milliamperes to 1000 amperes and over a range of overvoltages from about 130% to more than 200% of normal operating voltage.

It is also an object of the invention to protect the connected utilization equipment from the overvoltages described above.

It is a further object of the invention to protect all three metal-oxide-varistors in a surge suppressor system that provides suppression of transient voltage surges occurring at all three terminals that are to be connected to a source of AC voltage that has phase, neutral and grounding conductors and still limit both the steady state and transient leakage current to acceptable values as specified by recognized safety testing agencies.

Another object of the invention is to provide the protection described above in a system that after disconnecting the source of AC voltage restores electrical service by simply depressing a reset button.

Still another object the invention is to provide the protection system as described above from overvoltages that occur after a complete power failure and before normal operating voltage is restored.

Another further object of the invention is to provide a protection system as described above that does not suffer from nuisance disconnect response to electrical noise or transient voltage surges of the most severe magnitude likely to be encountered in the environment for which the surge suppressor is designed.

DETAILED DESCRIPTION OF THE INVENTION

Figure 1:
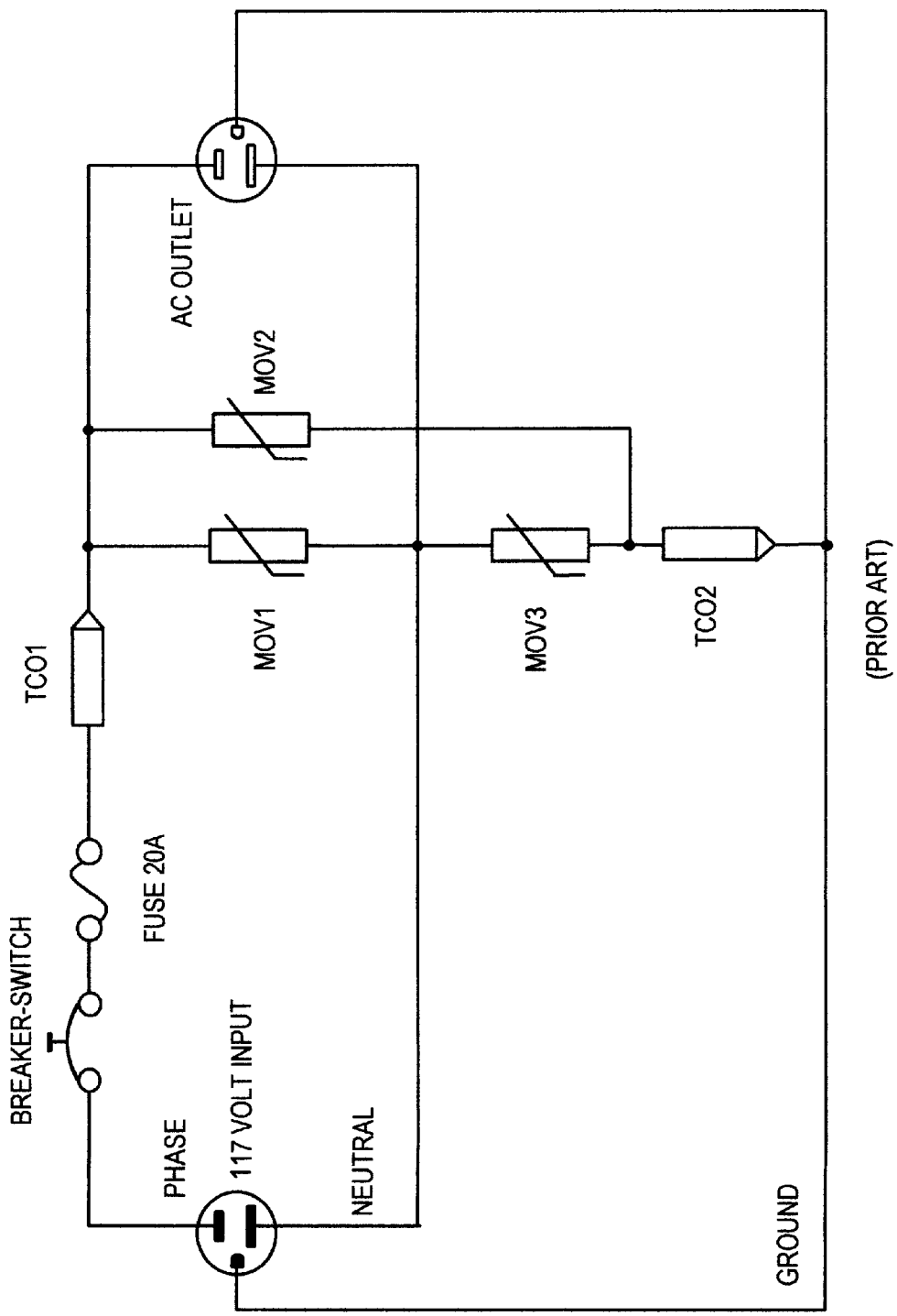
FIG. 1 is a schematic diagram of a prior art surge suppressor.
Figure 2:
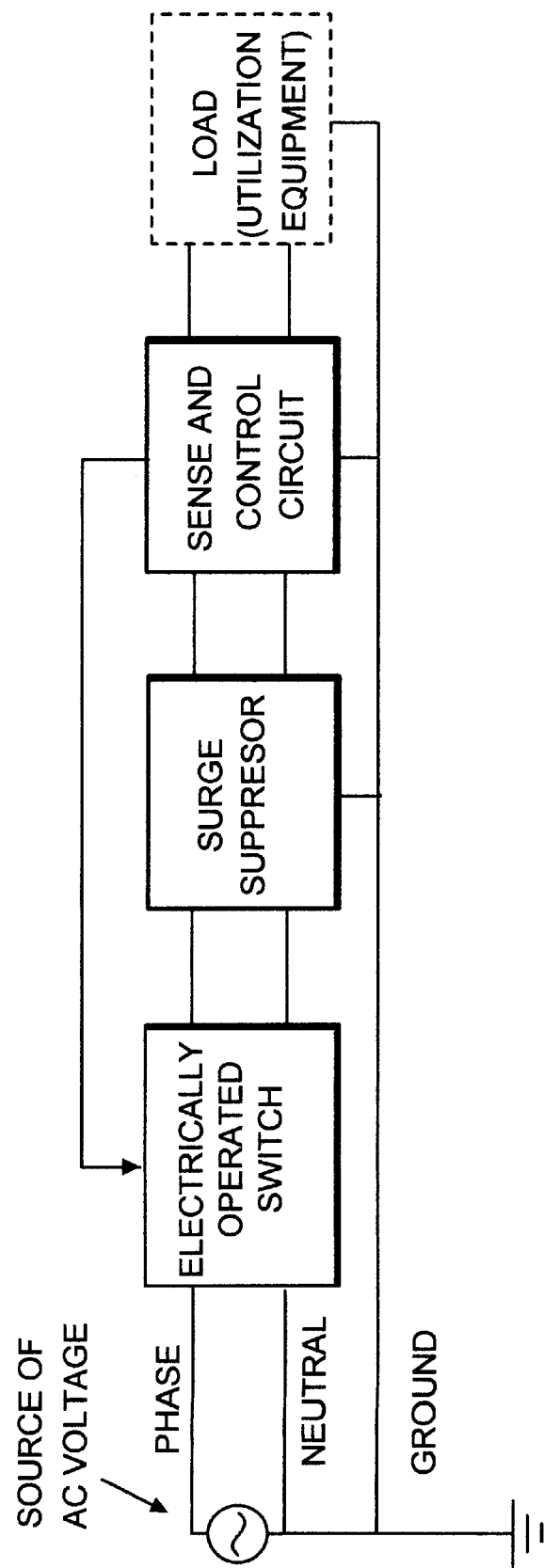
FIG. 2 is a block diagram of the protection system.

FIG. 2. is a block diagram showing a source of AC voltage, an ELECTRICALLY OPERATED SWITCH, a SURGE SUPPRESSOR, a SENSE AND CONTROL CIRCUIT and the utilization equipment represented by the LOAD. The protection system consists of the ELECTRICALLY OPERATED SWITCH interposed between the source of AC voltage and the SURGE SUPPRESSOR, and the SENSE AND CONTROL CIRCUIT.

Figure 4:
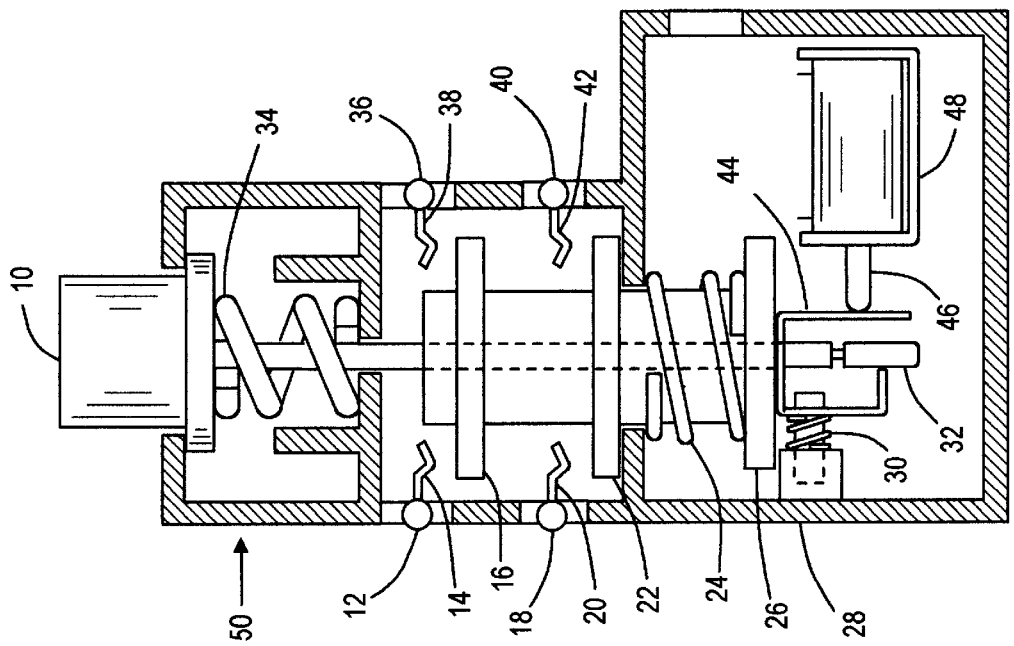
FIG. 4 is a symbolic drawing of a generic resettable circuit breaker with contacts open.
Figure 3:
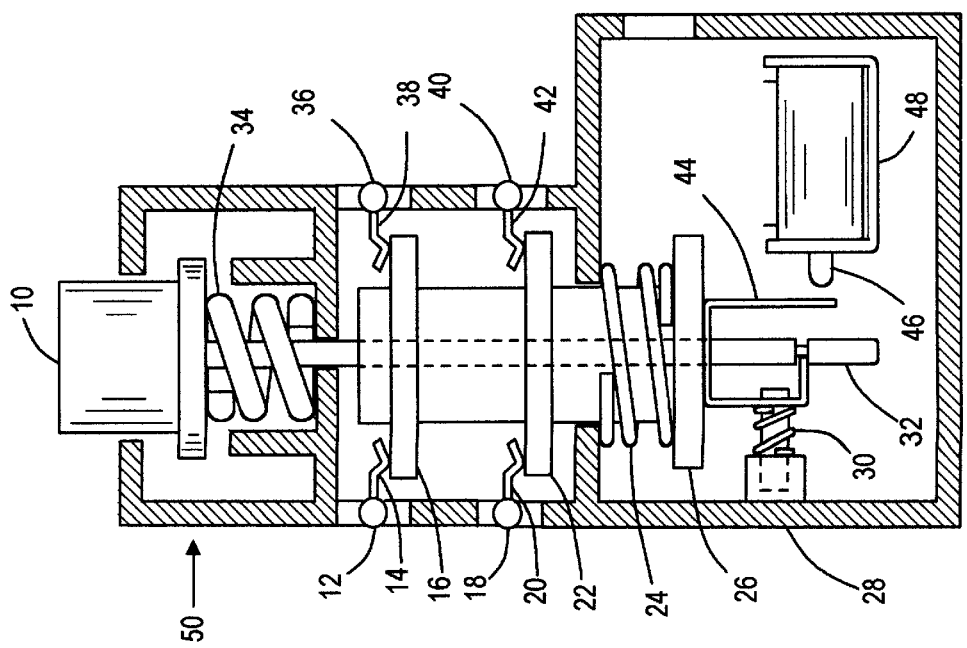
FIG. 3 is a symbolic drawing of a generic resettable circuit breaker with contacts closed.

FIG. 3 and FIG. 4 are symbolic drawings of a "trip-free" resettable circuit breaker. The drawings are not intended to represent an actual mechanical design but only to show symbolically the elements that are common to all such devices. Many variations of resettable circuit breakers exist in the art, particularly for use in ground fault circuit interrupters. For safety reasons these devices are designed to be trip-free; that is, the circuit will be interrupted even if the reset button is actuated during a fault condition.

The circuit breaker 50 is housed in a molded plastic enclosure 28. It is reset or latched in a contact closed position by depressing and releasing the reset button 10. A rod 32 affixed to the reset button 10 slides freely through the contact shorting bar carrier 26 and the latch 44. Metallic shorting bars 16 and 22 are molded into the plastic carrier 26. The latch 44 is urged toward the rod 32 by the latch spring 30 as shown in FIG. 3. When the reset button 10 is released, the latch 44 engages the rod 32 and is urged upward by the reset button return spring 34. The contact opening spring 24 is compressed by the greater force of the reset button return spring 34. The latch 44 pushes the shorting bar carrier 26 upward forcing the shorting bars 16 and 22 against the contacts 14 and 38, and, 22 and 42 respectively, thereby closing the circuits connected to these contacts. Contact closing force is essentially determined by the force difference between springs 34 and 24.

The solenoid 48 is of the push-rod variety; that is, the plunger 46 is forced outward from the solenoid 48 when the solenoid is energized. Upon being energized the solenoid-plunger 46 forces the latch 44 to release the rod 32 as shown in FIG. 4 allowing the reset button to be forced upward by spring 34. Opening-spring 24 forces the shorting bar carrier 26 downward thus moving the shorting bars 16 and 22 to disconnect their respective contacts. Terminals 12, 18, 36 and 40 provide connections from external conductors to the switching contacts 14, 20, 38 and 42 respectively.

Figure 5:
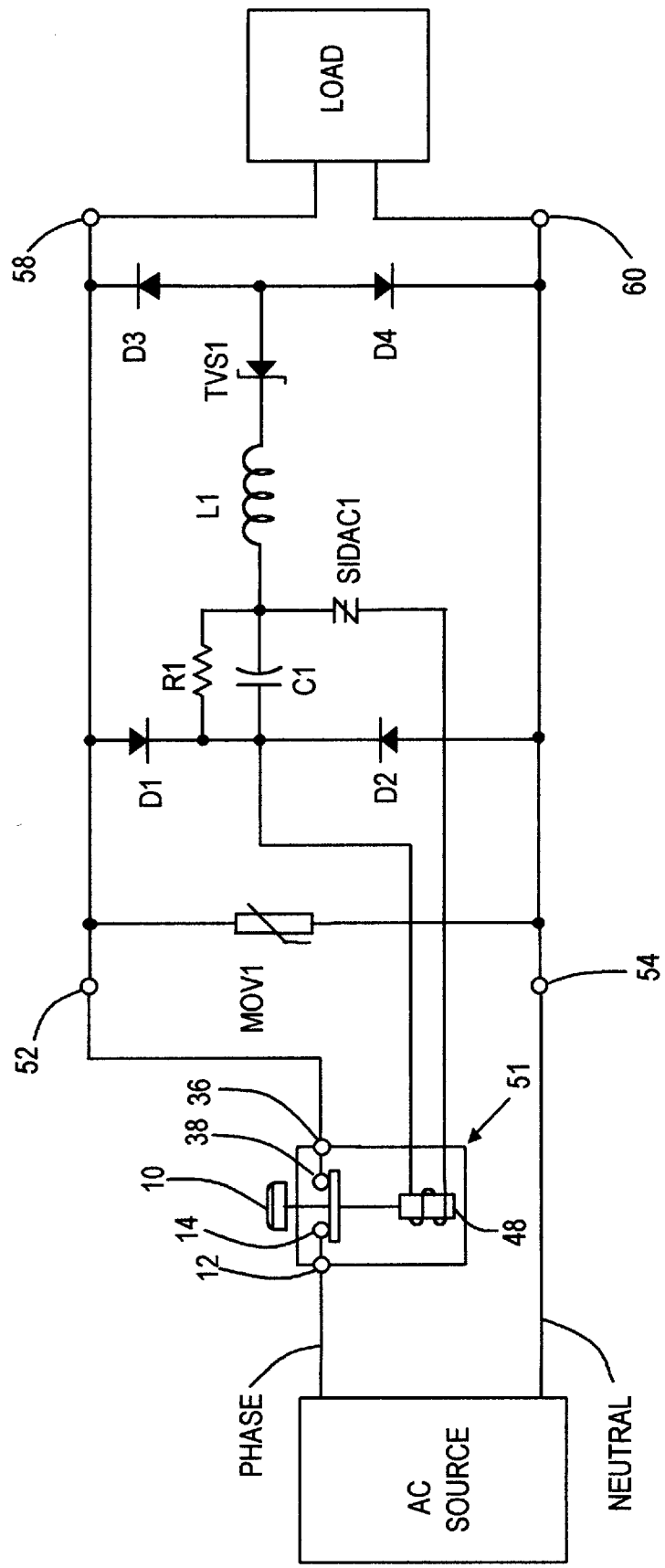
FIG. 5 is a schematic diagram of the protection system showing an embodiment applicable at a service entrance or major distribution electrical panel.

Following is a detailed description of the operation of one embodiment of the protection system with references to schematic diagram FIG. 5. This embodiment requires only a single pole circuit breaker 51, which is a single pole version of circuit breaker 50. It is applicable to distribution systems where there is no grounding conductor or where the grounding conductor is bonded to the neutral conductor at close proximity to the protection system, such as in utility service entry panels. Input terminal 52 connects the surge suppressor MOV1, the sense and control circuit, and the load PHASE conductor to the AC SOURCE PHASE conductor through the circuit breaker 51 output terminal 36, the disconnect terminals 14 and 38, and the AC SOURCE connection terminal 12. Terminal 58 provides for connection of the PHASE conductor to the LOAD. Terminals 54 and 60 provide for connection of the AC SOURCE NEUTRAL conductor to the protection system and the LOAD respectively. The sense and control circuit includes inductor L1, silicon avalanche diode TVS1, capacitor C1, resistor R1, and silicon bilateral switch SIDAC1. These components lie within the full wave rectifier bridge consisting of diodes D1 through D4.

It is desirable that the circuit breaker be actuated in the shortest possible time period after an overvoltage exceeds a safe magnitude. Much of the delay in opening the contacts arises from the mechanical inertia of the solenoid plunger and the latch mechanism it must move. To achieve faster action from electromagnetic devices such as relays and solenoids they can be "slugged" with a current pulse many times the minimum constant current magnitude that is required for mechanical actuation. The current pulse magnitude and time duration must be such that no damage to the coil winding of the device occurs as a result of excessive temperature rise. The magnetic force impulse applied to the plunger of a solenoid or to a relay armature is proportional to the product $I^2t$ where 'I' is the current 't' is the time duration of the current pulse. The greater the value of this magnetic impulse force, the more rapidly the plunger or armature will accelerate, even if the impulse ends before the plunger or armature has moved a substantial distance. When the magnetic force impulse is many times greater than the minimum force required for actuation, inertial forces are overcome more rapidly, thus reducing the actuating time.

In the circuit of FIG. 5, the coil of the solenoid 48 is energized by a peak current approximately five times greater that the constant current required to actuate the solenoid and open the circuit disconnect switch. The energy to provide this current is stored as voltage in capacitor C1. It is an important feature of the protection system that the energy to actuate the circuit breaker is stored in a capacitor. This assures actuation of the circuit breaker from the Limited Current Overvoltage described in 3. above even though those current levels are too low to actuate the circuit breaker. The silicon bilateral voltage triggered switch SIDAC1, breaks down from very high impedance to very low impedance at a specified breakdown voltage. In this embodiment a SIDAC rated at a nominal breakdown voltage of 100 volts is used.

The silicon avalanche diode TVS1 is inserted in the capacitor charging circuit in order to reduce the required voltage ratings of the capacitor C1 and the SIDAC SIDAC1 to about 100 volts, permitting the use of smaller and less costly versions of these components. The silicon avalanche diode TVS1, has a reverse standoff voltage of 75 volts and a nominal conduction voltage of 88 volts at a current of 1 milliampere. After voltages higher than 88 volts are applied, conduction increases rapidly so that in this region the device exhibits a dynamic resistance less than 1 ohm. This device could be any other threshold voltage conducting device such as a an 82 volt zener diode or a MOV rated for 50 volts RMS and has a nominal conduction threshold of 82 volts. A silicon avalanche diode is preferred however because of its lower dynamic resistance in the conducting region.

When a power frequency overvoltage occurs, the voltage on capacitor C1 rises. When the voltage reaches the trigger voltage of SIDAC1 it will switch from a high impedance condition to very low impedance thus discharging the capacitor C1 through the solenoid actuator 48. The circuit breaker contacts will open to protect MOV MOV1 and the LOAD from being damaged by the overvoltage.

The threshold conduction voltage of the silicon avalanche diode TVS1 and the breakdown voltage of the voltage triggered switch SIDAC1 are carefully selected to satisfy the following criteria:

1) The 'normal' variation of a 120-volt AC power source is 105 to 130 volts. At 130 volts the voltage on capacitor C1 must be less than the breakdown voltage of the voltage triggered switch SIDAC1 so that nuisance shutdown of the connected equipment is avoided. Power line voltages about 20 volts in excess of this should be rapidly disconnected to avoid potential damage to the MOVs or the connected utilization equipment.

2) If the peak AC voltage applied to a metal-oxide-varistor rises slightly above that device's threshold conduction voltage, current will begin to flow through the device for the brief time period during which the threshold voltage is exceeded. Energy will be deposited in the varistor and the temperature of the device will rise. If the steady state power dissipation rating of the varistor is exceeded, the temperature may rise excessively and the threshold conduction voltage, which has a negative temperature coefficient, will decrease. If the overvoltage source can supply a high level of current the varistor will go into thermal runaway resulting in severe overheating, possibly rupturing the body and emitting smoke and flames. If the current is limited but the power dissipation in the varistor exceeds its maximum steady power dissipation rating it may experience an extreme temperature rise, burn off its conformal coating and glow hot enough to ignite nearby flammable material or even burn through a metal enclosure. For a 20 millimeter varistor rated at 130 volts RMS, its rated one watt power dissipation on a 60 Hz power line will occur at an applied voltage of about 170 volts RMS. With the parameters stated previously for the silicon avalanche diode and the silicon bilateral switch, the circuit breaker will be actuated at a power frequency overvoltage of about 150 volts RMS. This will protect the MOV MOV1 from the Limited Current Power Frequency Overvoltage.

3) During a power frequency overvoltage with high available current, the circuit breaker 50 must disconnect the power source rapidly enough to prevent the energy deposited in a surge suppression varistor from damaging the varistor by exceeding its maximum single impulse energy rating. For a 20 millimeter MOV rated at 130 volts RMS the maximum energy rating is 70 joules. Computer simulations have determined that a twice normal overvoltage of 240 volts from a 1000 ampacity source, as specified for testing in the UL1449 standard, when applied to a 20 millimeter, 130 volt RMS MOV, will deposit about 12 joules in each half cycle of a 60 Hz power source. Therefore, it should take about three cycles or about 50 milliseconds to deposit 70 joules. It has been found that the protection system disclosed herein will disconnect the source in about 2 milliseconds after the MOV begins to conduct current. This provides a comfortable margin of safety for protecting the varistor from a 240-volt overvoltage. Computer analysis shows that the maximum overvoltage this system is capable of protecting is about 440 volts RMS. At that magnitude an unprotected 130-volt, 20 mm MOV would absorb about the maximum single impulse energy rating of 70 joules in the first half cycle. The protection system would open the circuit breaker before that amount of energy is deposited, thus protecting the MOV from damage.

As stated previously, an important feature of the protection system is that it does not disconnect the power source when exposed to electrical noise or transient voltage surges. The criterion met in this invention is that it shall not disconnect the AC source when the most energetic transient voltage surge it is designed to suppress is applied from the AC source. The sense and control system is designed to protect surge suppressors which are subjected to a waveform defined in ANSI C62.41 as a Category B surge. This wave is defined as a "biwave" having a peak open circuit voltage of 6000 volts with a 1.2 microsecond risetime and a decay time to one-half peak voltage of 50 microseconds. It has a short circuit peak current waveform of 3000 amperes with an 8-microsecond risetime and a decay time to one-half peak current of 20 microsecond. To protect against false or nuisance disconnecting of the AC power source upon exposure to this transient voltage surge it is necessary to take advantage of the time duration difference between the surge waveform and the low frequency of the AC source. This is accomplished by including the inductance L1 in series with the silicon avalanche diode SAD1 and the capacitor C1. The inductance acts as a charge limiting impedance to the short duration transient voltage surge thus effectively limiting the voltage rise in C1 to a value safely below the breakdown voltage of silicon bilateral switch SIDAC1. The inductance has virtually no effect toward limiting the charge on the capacitor from the AC voltage source.

Operation of a preferred embodiment of the invention is explained with reference to FIG. 6. This embodiment is applicable to locations remote from an entry service or major distribution panel where a grounding conductor is to be connected to a grounding point provided on the utilization equipment. The surge suppressor employs two additional suppression components, MOVs MOV2 and MOV3 and provides protection from short duration transient voltage surges at all three ports of the load. Protection of MOV MOV3 from a power frequency overvoltage is provided by the second disconnect switch of the circuit breaker 50. This second disconnect switch interrupts the AC SOURCE NEUTRAL conductor, which is connected to terminal 18 of the circuit breaker. Second load terminal 40 is connected to a second input terminal 54 of the protection system and to terminal 60, which provides for a NEUTRAL conductor connection to the LOAD. The shorting bar engaging the switch contacts 20 and 42 completes the NEUTRAL circuit. Terminal 56 of the protection system is to be connected to the AC SOURCE grounding conductor GROUND and to terminal 62, which provides for connection of the grounding conductor to the LOAD.

The sense and control circuit elements include the energy storage capacitor C2, capacitor discharge resistor R2, charge limiting resistor R3, N-channel field effect transistor Q1, silicon avalanche diode TVS2 voltage dividing resistors R4 and R5, zener diode D7, and threshold voltage triggered switch SIDAC2. These components lie within the diode array consisting of diodes D1 through D6. This diode array functions as a full wave rectifier for voltage appearing at any of the three AC SOURCE nodes: PHASE-TO-NEUTRAL, PHASE-TO-GROUND and NEUTRAL-TO-GROUND. Thus the sense and control circuit can operate to provide protection of all three MOVs and for all three ports of the LOAD.

Under normal operating voltage conditions Q1 will remain in a non-conducting state. The threshold voltage of silicon avalanche diode TVS2 is chosen to be greater than the peak voltage of the normal AC SOURCE voltage operating range. This threshold voltage, however, will be exceeded by the peak voltage of a power frequency overvoltage that is threatening to the metal-oxide-varistors. Upon the presence of such a voltage, the diode TVS2 will conduct current and the gate-to-source voltage of transistor Q1 will rise causing it conduct current to charge capacitor C2. R3 limits the initial charging current to a safe value for Q1. When the voltage on capacitor C2 rises to the threshold trigger voltage of voltage triggered switch SIDAC2 it will switch to a low impedance and discharge capacitor C2 through the circuit breaker solenoid 48 to actuate the disconnect mechanism.

Zener diode D7 limits the gate voltage to a safe value for transistor Q1 in the event of a very large power frequency overvoltage or transient voltage surge. R5 lowers the gate-to-source impedance to prevent a short duration rapid rise-time transient voltage surge from being coupled through the drain-to-gate capacitance of Q1 and causing it to turn on. Resistor R3, in addition to limiting the initial charging current to a safe value for transistor Q1, acts as a charge limiting device during a short duration transient voltage surge, in the same manner that L1 does in FIG. 5, thus preventing nuisance actuation of the protection system from such surges.

Capacitor discharge resistor R2 prevents an accumulation of charge in capacitor C2 that could occur from a series of severe transient voltage surges occurring several seconds apart, as might happen during a severe thunderstorm. This avoids nuisance disconnect operation in the event of such a circumstance.

Figure 6:
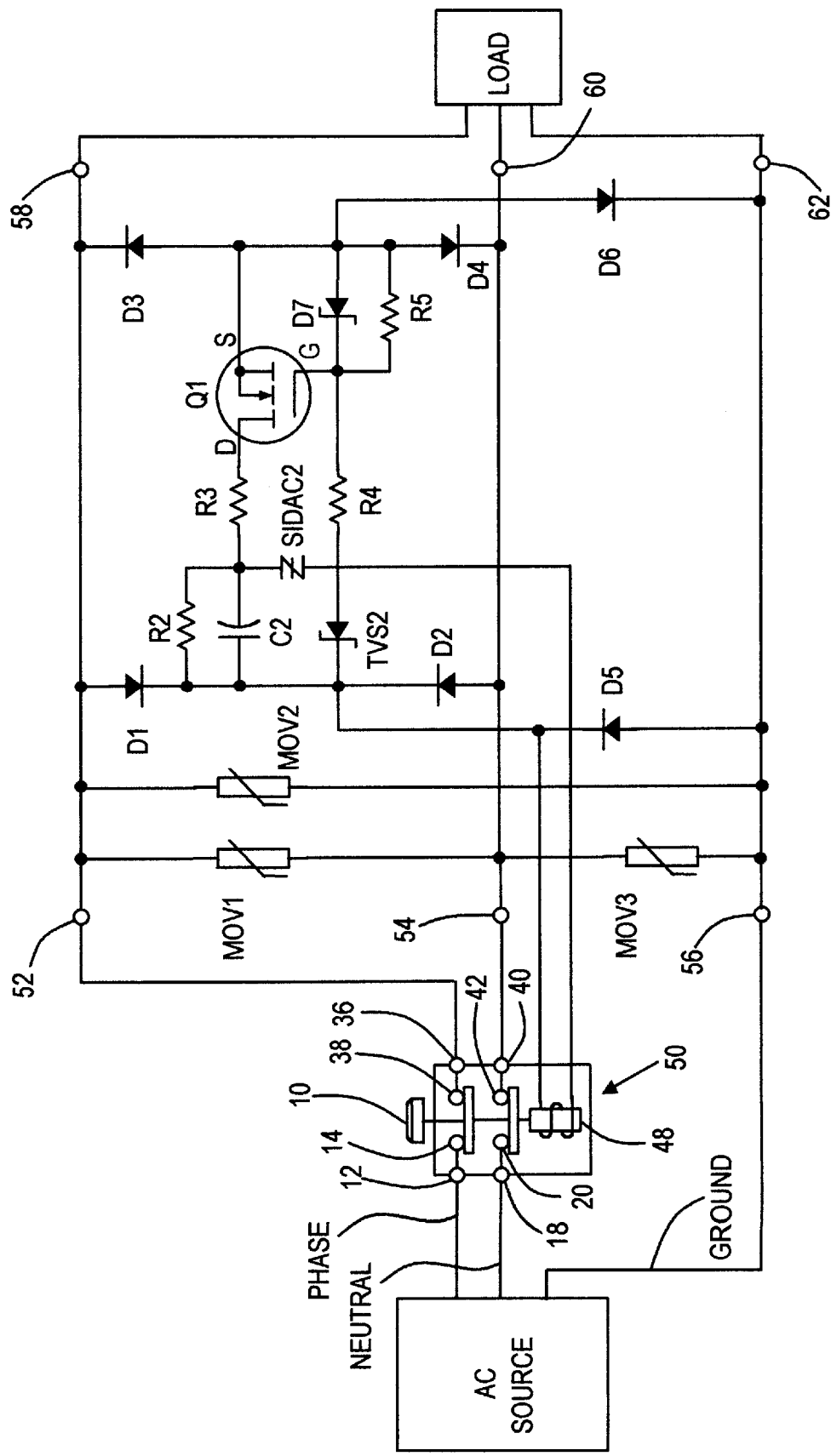
FIG. 6 is a schematic diagram of the protection system showing a preferred embodiment applicable at a location remote from a service entrance or major distribution panel employing a grounding conductor.

In the configuration of FIG. 6 there are two conductive paths from the PHASE and NEUTRAL conductors to the GROUND conductor. One path is through transistor Q1 and the other path is through silicon avalanche diode TVS2. The threshold conduction voltage of silicon avalanche diode TVS2 is about 200 volts, which is safely above the peak voltage of the highest normal operating voltage. Consequently transistor Q1 is in a non-conducting state under normal operating voltage conditions since no current is available to apply gate voltage for conduction. Thus there is virtually no leakage current, either steady state or transient, with this design.

Figure 7:
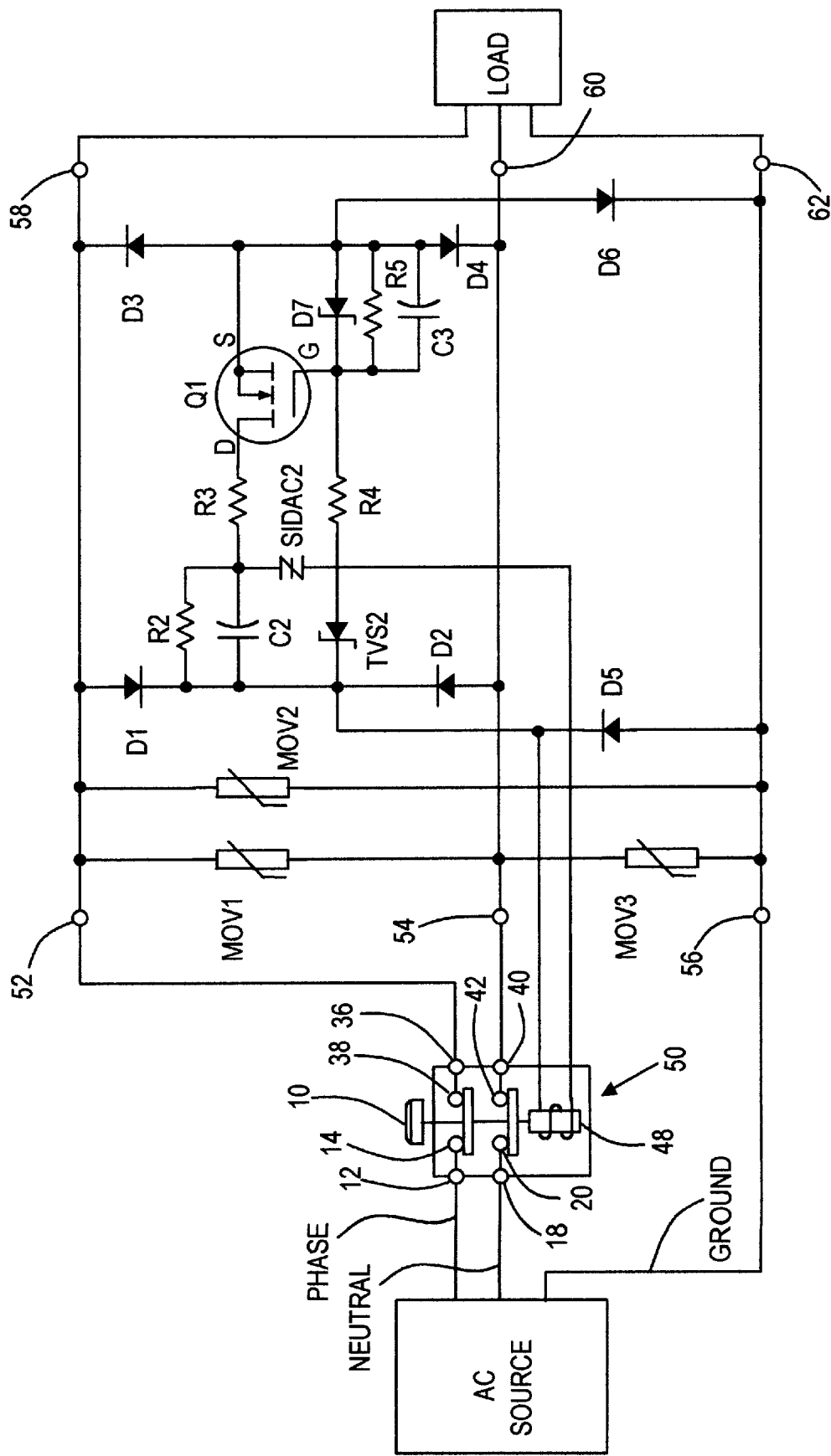
FIG. 7 is a schematic diagram of the protection system showing the alternative use of a low-pass filter to prevent nuisance operation from short duration transient voltage surges.

FIG. 7 is a schematic diagram of an alternative embodiment of the protection system that employs a low-pass filter to prevent nuisance disconnection from a short duration transient voltage surge. Capacitor C3 is connected to the gate and source terminals of Q1. Together with R4 it forms a low-pass filter that prevents the gate voltage from rising to a level that causes Q1 to conduct during a transient voltage surge of the greatest magnitude anticipated.

Figure 8:
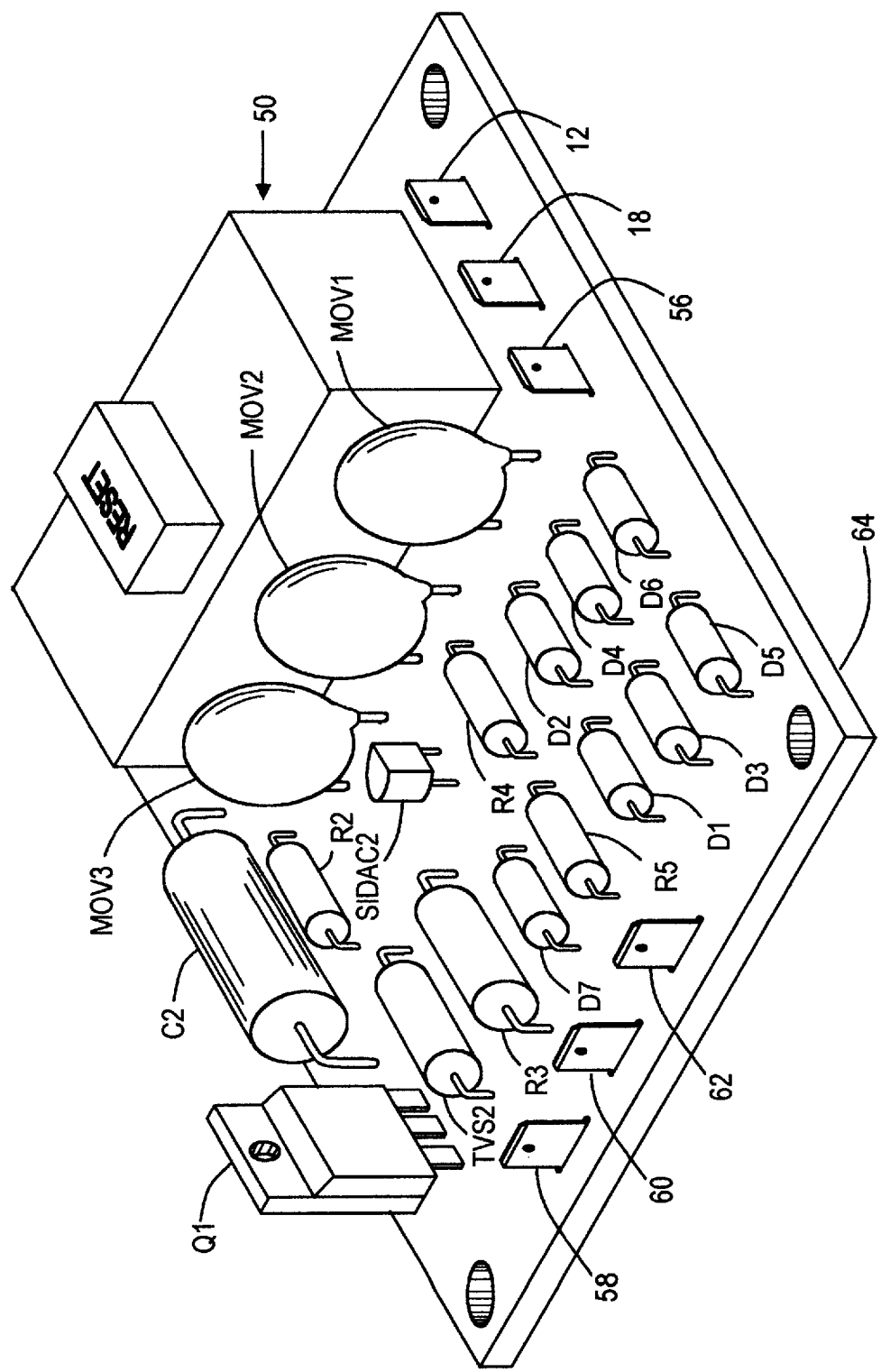
FIG. 8 is a perspective drawing of the protection system shown in FIG. 6.

FIG. 8 is a perspective drawing of a preferred form of the protection system shown in FIG. 6 assembled on a printed circuit board 64. The assembly forms a module that can conveniently be included in a multiple outlet strip, a portable current tap or built into utilization equipment. The assembly includes the resettable circuit breaker 50, a "faston" terminal 12 for connection to the phase conductor of an AC source of voltage, a faston terminal 18 for connection to the neutral conductor and a faston connector 56 for connection to a grounding conductor. Corresponding output faston terminals 58, 60 and 62 provide convenient connections to the load. The surge suppressor components MOV1, MOV2 and MOV3 are included in the assembly. Also included are diode array components D1 through D6, capacitor C2, resistors R2, R3, R4 and R5, silicon avalanche diode TVS2, silicon voltage triggered switch SIDAC2, N-channel FET Q1, and zener diode D7.

Figure 9:
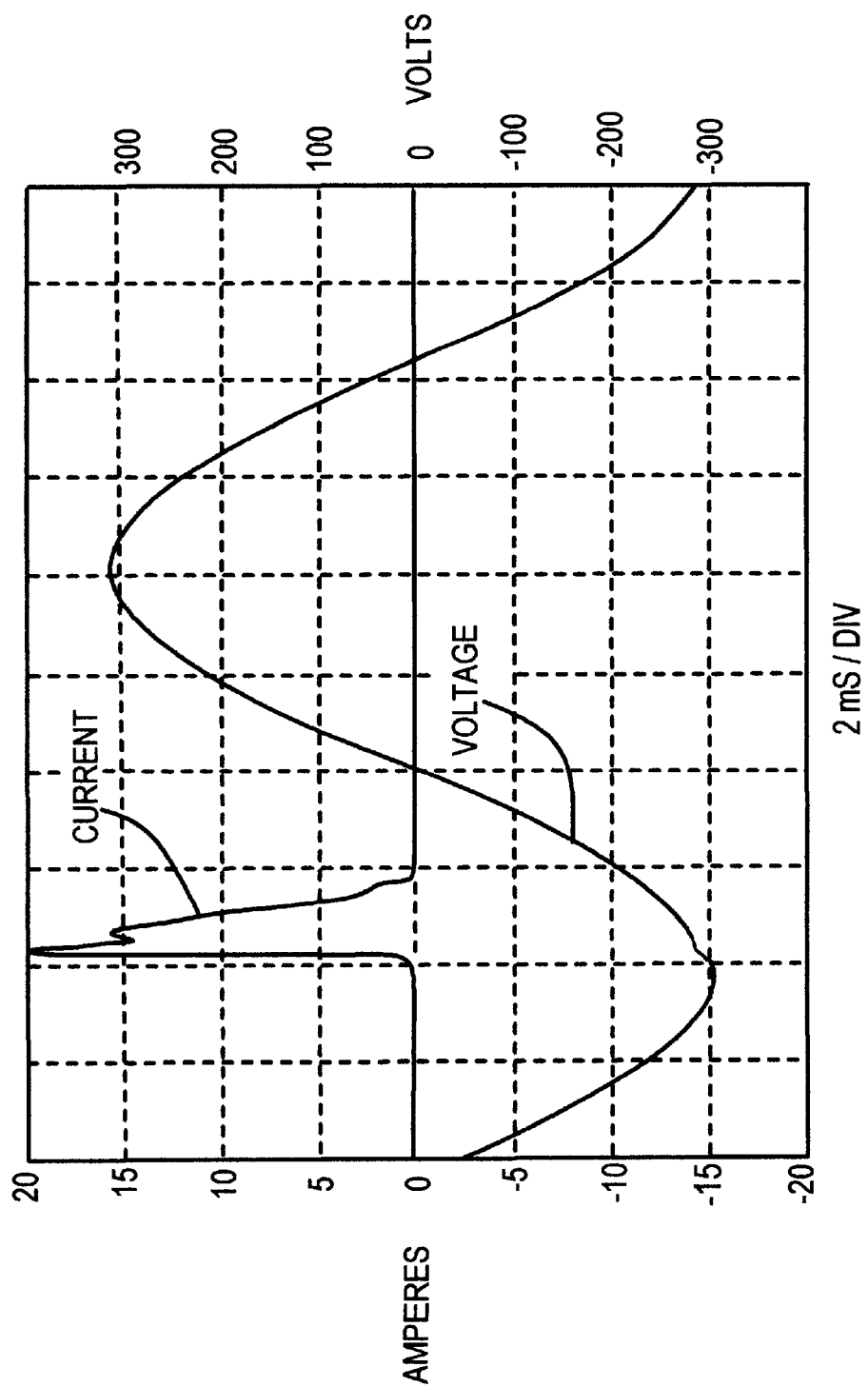
FIG. 9 and FIG. 10 are oscillograms exhibiting the performance of the protection system shown in FIG. 5.
Figure 10:
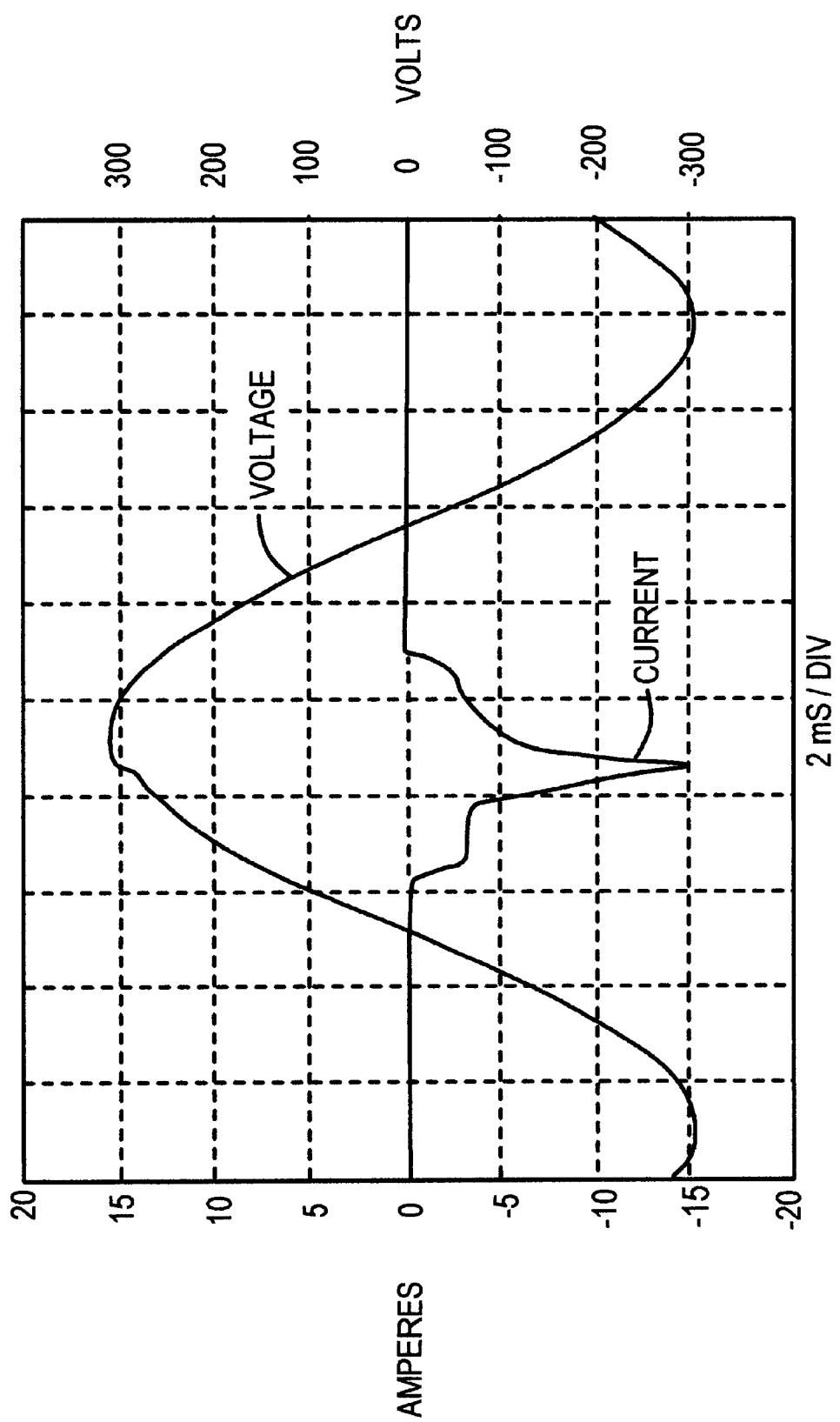

FIG. 9 is an oscillogram of voltage and current waveforms when a 220 RMS overvoltage is applied to the protection system near the negative peak of the AC cycle. The current rises almost instantly as the MOV conducts the overvoltage current. The breaker contacts open in a fraction of a millisecond and the current falls to zero in less than two milliseconds as the contacts clear. FIG. 8 is an oscillogram of voltage and current waveforms when a 220 RMS overvoltage is applied to the protection system near the positive going zero crossing. Line current rises initially as the capacitor charges. The line current stays constant for a brief period and then rises as the MOV threshold voltage is reached. The MOV current slightly reduces the line voltage until the contacts open just before the peak of the positive half cycle. A slight jump in line voltage can be observed the moment the contacts open. It can be seen that the MOV is absorbing energy only during the interval of the steep rise in current, an interval of about one millisecond. Repeated applications of these overvoltages to the protection system showed that they had no effect upon the MOV's characteristic parameters, thus verifying absence of damage.

All of the components shown in the schematic diagrams FIGS. 5, 6, and 7 are identified and described by a standard value or vendor part number as shown in the following table:

| COMPONENT | TYPE OR VALUE | MANUFACTURER |
|---|---|---|
| Diodes D1 through D6 | 1N4005 | Motorola |
| L1 | 15mH | Various |
| TVS1 | SAC75A/88V | Motorola |
| TVS2 | P6KE200 200V | General Semiconductor |
| C1 | 33uF/100VDC | Illinois Capacitor |
| C2 | 22uF/200VDC | Illinois Capacitor |
| C3 | 0.1uF/25V | RMC |
| Q1 | IRF710 | International Rectifier |
| R1 | 1.5M ohms/¼W | Various |
| R2, R4 | 4.7k ohms/¼W | Various |
| R3 | 75 ohms/2W | Various |
| R4 | 47k ohms/¼W | Various |
| SIDAC1 | K1200E/100V | Teccor |
| SIDAC2 | K2000F1/200V | Teccor |
| MOV1, MOV2, MOV3 | 130 VRMS/70 Joule | Various |

While the invention has been described with reference to a preferred embodiment, it will be understood by those skilled in the art that many other embodiments are possible. For instance, the protection system could be incorporated in an enclosure with a duplex electrical outlet for mounting in an electrical wall box. Another embodiment could include an enclosure with electrical outlets on one surface and plug blades on the opposite surface for direct insertion into a wall outlet. Another embodiment could package the protection system in an electrical distribution panel circuit breaker and surge suppressor combination. Also, it will be understood by those skilled in the art, that various circuit changes may be made and equivalents substituted thereof without departing from the broader aspects of the protection system. Furthermore, while generally specific claimed details of the invention constitute important specific aspects of the protection system, in appropriate instances even the specific claims involved should be construed in light of the doctrine of equivalents.

What is claimed is:

1. In an electrical disconnect system for protecting a transient voltage surge suppressor from power frequency overvoltages and also for protecting a load comprising utilization equipment connected thereto from said power frequency overvoltages, said system including input terminals for connection to a source of AC voltage, and output terminals for connection to said utilization equipment, surge suppressor components connected to said input terminals for clamping short duration transient voltage surges to a safe value, said surge suppressor components and said utilization equipment being capable of enduring said power frequency overvoltage for a brief period of time without damage, said system comprising:

an electrically operated switch having AC source connection terminals for connection to said source of AC voltage and load connection terminals connected to said input terminals, a resettable disconnect switch for connecting and disconnecting said AC source connection terminals from said load connection terminals, a switch operating mechanism for opening said disconnect switch when energized, to disconnect said AC source connection terminals from said load connection terminals, and a latch mechanism for resetting said disconnect switch for reconnecting said AC source connection terminals to said load terminals; and a sense and control circuit for rapidly energizing said switch operating mechanism upon a power frequency overvoltage at said input terminals, said sense and control circuit including a capacitor and a capacitor charge circuit therefor for charging said capacitor directly from said input terminals to a disconnect switch operating voltage level which energizes said switch operating mechanism to open said disconnect switch, and a capacitor discharge switch connected between said capacitor and said switch operating mechanism to couple thereto the voltage charge on the capacitor when it reaches said disconnect switch operating voltage level, whereby said disconnect switch disconnects said input terminals from the AC source connection terminals before the end of said brief time period during which said surge suppressor components and said utilization equipment can endure said power frequency overvoltage without damage, thereby protecting both the surge suppressor and the utilization equipment from said power frequency overvoltage.

2. The electrical disconnect system as defined in claim 1 wherein said electrically operated switch is a mechanical circuit breaker having an electromagnetically actuated disconnect switch operating mechanism and a manual resetting mechanism.

3. The electrical disconnect system as defined in claim 1 wherein said electrically operated switch is a solid state relay having an electrically isolated control section for rendering said relay non-conductive and for resetting it to a conductive state.

4. The electrical disconnect system as defined in claim 1 wherein said capacitor discharge switch is a threshold voltage triggered switch that remains in a high impedance condition to prevent energization of said disconnect switch operating mechanism until the charge on said capacitor reaches said disconnect switch operating voltage level, at which level the threshold voltage triggered switch is switched to very low impedance thereby discharging the capacitor through said switch operating mechanism.

5. The electrical disconnect system as defined in claim 4 wherein said threshold voltage triggered switch is a silicon bilateral voltage triggered switch, also known as a SIDAC, and a SIDACTOR.

6. The electrical disconnect system as defined in claim 1 wherein said sense and control circuit includes a full-wave rectifier bridge with all other sense and control circuit elements contained within the bridge, so that any sense and control circuit element is either unipolar or bipolar, whereby a power frequency overvoltage that reaches a level that is to open said disconnect switch charges said capacitor to said switch energizing level, whether said overvoltage is instantaneously positive or negative.

7. The electrical disconnect system as defined in claim 1 wherein there is connected in series with said capacitor, charge-limiting impedance such that the charge on the capacitor from said power frequency overvoltage is not reduced to less than said disconnect switch operating voltage level, but the charge from a short duration transient voltage surge is reduced to less than said disconnect switch operating voltage level.

8. The electrical disconnect system as defined in claim 7 wherein said charge-limiting impedance is an inductor.

9. The electrical disconnect system as defined in claim 7 wherein said charge-limiting impedance is a resistor.

10. The electrical disconnect system as defined in claim 7 wherein said short duration transient voltage surge is of the largest magnitude anticipated in the environment for which the system and said surge suppressor is designed.

11. The electrical disconnect system as defined in claim 6 wherein there is included in said capacitor charge circuit a threshold voltage conducting device that substantially blocks the flow of current until the breakdown voltage is applied, thereby reducing the voltage applied to the capacitor to less than the peak voltage of said source AC voltage by about the magnitude of said breakdown voltage.

12. The electrical disconnect system as defined in claim 1 wherein said source of AC voltage has a phase conductor and a neutral conductor to be connected to respective ones of said input terminals, and a grounding conductor to be connected to a desired grounding point on said utilization equipment and there is provided in said system a ground input terminal for connecting said grounding conductor to the system and a ground output terminal for connection to said grounding point on said utilization equipment, connections from said system input ground terminal and said phase and neutral input terminals to three separate surge suppressor components connected across the three pairs of input terminals involved so that all ports of the utilization equipment are surge protected thereby, and a six rectifier array connecting said input terminals to said sense and control circuit to form full-wave rectifier bridge circuits so that any sense and control circuit element is either unipolar or bipolar, whereby a power frequency overvoltage imposed on any pair of said input terminals that reaches a level that is to open said disconnect switch, charges said capacitor to said switch energizing level, whether said overvoltage is instantaneously positive or negative.

13. The electrical disconnect system as defined in claim 12 wherein said disconnect switch has two poles that simultaneously disconnect both said load terminals from said AC source connection terminals.

14. The electrical disconnect system as defined in claim 12 wherein all the circuit paths between said phase and neutral input terminals and said ground input terminal include components that block current when the voltage from said source of AC voltage is within the normal electric utility supply voltage range and said blocked current is less than both the steady-state and transient current limits permitted under the method for leakage current testing as specified by recognized electrical safety testing agencies to preclude electric shock hazard.

15. The electrical disconnect system as defined in claim 12 wherein said charge circuit of said capacitor includes a controlled switch in series with said capacitor and said input terminals that allows said capacitor to charge to said disconnect switch operating level only when said power frequency overvoltage reaches a level that is to open said disconnect switch.

16. The electrical disconnect system as defined in claim 15 wherein said controlled switch in the charge circuit of said capacitor includes load terminals in series therewith, a control terminal and connection thereof to said input terminals that keeps the load terminals non-conductive until said control terminal receives a given control voltage.

17. The electrical disconnect system as defined in claim 16 wherein said controlled switch is a transistor.

18. The electrical disconnect system as defined in claim 16 further including a threshold voltage conducting device in series with said control terminal so that said given control voltage is not applied until a power frequency overvoltage reaches a level that is to open said disconnect switch.

19. The electrical disconnect system as defined in claim 16 further including a threshold voltage triggered switch in series with said control terminal so that said given control voltage is not applied until a power frequency overvoltage reaches a level that is to open said disconnect switch.

20. The electrical disconnect system as defined in claim 16 wherein the circuit of said control terminal includes a low-pass filter that will not significantly reduce the level of said control voltage resulting from a power frequency overvoltage; but will reduce said control voltage to a level less than that required to activate said controlled switch when a short duration transient voltage surge occurs at said input terminals, said short duration transient voltage surge being of the greatest magnitude in the environment for which the system is designed.

* * * * *

UNITED STATES PATENT AND TRADEMARK OFFICE
CERTIFICATE OF CORRECTION

PATENT NO : 6,118,639
DATED : September 12, 2000
INVENTOR(S) : Richard Goldstein It is certified that error appears in the above-identified patent and that said Letters Patent are hereby corrected as shown below:

Column 8, Line 56:  Change "and 22 against the contacts 14 and 38, and 22 and 42" to "and 22 against the contacts 14 and 38, and 20 and 42"

Column 10, Line 56:  Change "50" to "51"

Column 13, Line 19:  Change "8" to "10"

Signed and Sealed this

Twenty-fourth Day of April, 2001

Attest:

NICHOLAS P. GODICI

Attesting Officer     Acting Director of the United States Patent and Trademark Office